United States Patent
Schanz et al.

(10) Patent No.: US 7,274,788 B2
(45) Date of Patent: Sep. 25, 2007

(54) MOUNTING FOR ELECTRONIC ACCESSORIES FOR VEHICLES

(76) Inventors: Jochen Schanz, Auf dem Zimmermann 7-9, Niedereschach (DE) 78078; Herbert Schwarz, Auf dem Zimmermann 7-9, Niedereschach (DE) 78078

(*) Notice: Subject to any disclaimer, the term of this patent is extended or adjusted under 35 U.S.C. 154(b) by 422 days.

(21) Appl. No.: 10/496,599

(22) PCT Filed: Nov. 26, 2002

(86) PCT No.: PCT/EP02/13274

§ 371 (c)(1),
(2), (4) Date: May 24, 2004

(87) PCT Pub. No.: WO03/047911

PCT Pub. Date: Jun. 12, 2003

(65) Prior Publication Data

US 2005/0013435 A1    Jan. 20, 2005

(30) Foreign Application Priority Data

Dec. 1, 2001   (DE) ................................ 101 58 443

(51) Int. Cl.
*H04M 1/00* (2006.01)
(52) U.S. Cl. ...................................... 379/445; 379/446
(58) Field of Classification Search ............... 379/445, 379/446, 454–455, 420.01, 420.02, 420.03, 379/420.04; 455/90.1, 90.3, 569.1, 569.2, 455/575.9; 248/309.1
See application file for complete search history.

(56) References Cited

U.S. PATENT DOCUMENTS

| | | | | | |
|---|---|---|---|---|---|
| 4,066,307 | A | * | 1/1978 | Barding | 312/242 |
| 4,235,492 | A | * | 11/1980 | Conger | 312/242 |
| 4,646,344 | A | * | 2/1987 | Goldhorn et al. | 455/575.9 |
| 4,741,185 | A | * | 5/1988 | Weinert et al. | 70/57 |
| 5,349,637 | A | * | 9/1994 | Miller | 379/445 |
| 5,588,041 | A | * | 12/1996 | Meyer et al. | 455/569.2 |
| 5,754,962 | A | * | 5/1998 | Griffin | 455/569.2 |
| 6,243,463 | B1 | * | 6/2001 | Cheon | 379/446 |
| 6,659,382 | B2 | * | 12/2003 | Ryczek | 242/379 |
| 7,103,397 | B2 | * | 9/2006 | Oh | 455/575.9 |

* cited by examiner

*Primary Examiner*—Curtis Kuntz
*Assistant Examiner*—P L Dabney
(74) *Attorney, Agent, or Firm*—Gudrun E. Huckett

(57) ABSTRACT

A mounting device for electronic accessories for vehicles has a mounting having a shape matched to the shape of an accessory to be received. A mechanical lock is connected to the mounting. The lock has a locking bar that engages a housing recess in the form of a groove or a housing edge of the accessory received in the mounting. The lock has a key for manual actuation of the lock by rotating the key in the lock and moving the locking bar in and out of engagement of the housing recess or the housing edge.

9 Claims, 5 Drawing Sheets

MOUNTING FOR ELECTRONIC ACCESSORIES FOR VEHICLES

BACKGROUND OF THE INVENTION

The invention relates to a mounting for electronic accessories for vehicles wherein the mounting has a lock comprising a locking bar and surrounds in a shape-matched way the electronic accessory to be inserted.

Such a mounting is disclosed in DE 10051676 A1. The accessory is a mobile phone that is arranged so that it can be locked by means of a mounting in the interior of the vehicle. For locking the mobile phone, a drawer-like part is inserted in a socket of the mounting and is provided with a cylinder lock with locking bar. The drawer-type part is connected to a bracket. After insertion of the drawer, the bracket clamps the mobile phone in its mounting. In another mounting disclosed in this document, a pivotable locking bar penetrates the socket of the mounting and, when locking, engages a slotted recess of the mounting that is located in the lower rearward area of the mounting. A disadvantage of this known mounting for securing the accessory is its complex configuration.

U.S. Pat. No. 3,333,911 and WO 99/60833 A1 also disclose lockable mountings for electronic accessories. In these mountings of a two-part or multi-part configuration, it is the mounting itself that is locked and in this way blocks the accessory.

U.S. Pat. No. 3,822,049 discloses a lockable mounting which has a projection with a recess in an upper mounting part. For locking the accessory, a padlock is inserted into this recess and locked. The upper mounting part on which the recess is provided, is connected to a corresponding counter mounting part that is fastened on the topside of the accessory.

DE 19718 173 A1 discloses an electromechanical locking system for protecting a computer system against unauthorized removal of a hardware component.

U.S. Pat. No. 3,965,705 discloses a further lockable mounting wherein the lock is mounted on the accessory itself and locks by means of a telescoping holder.

It is an object of the invention to further develop the mounting of the aforementioned kind such that the electronic accessory can be secured in a simple way in the mounting.

For solving this object it is proposed according to the invention that a mounting of the aforementioned kind is configured such that the locking bar engages a housing recess or locks a housing edge.

For operating the mounting according to the invention, the accessory is inserted into the shape-matched mounting. Subsequently, the lock is rotated wherein the locking bar engages either a groove of the accessory or an edge of the accessory. In this way, a simple securing action for the accessory is provided in the mounting; the complex configuration used in the prior art is no longer necessary.

BRIEF DESCRIPTION OF THE DRAWINGS

The invention will be explained in the following with the aid of the drawing in more detail. The drawing shows embodiments of the invention. It is shown in.

DESCRIPTION OF PREFERRED EMBODIMENTS

Figure 1:
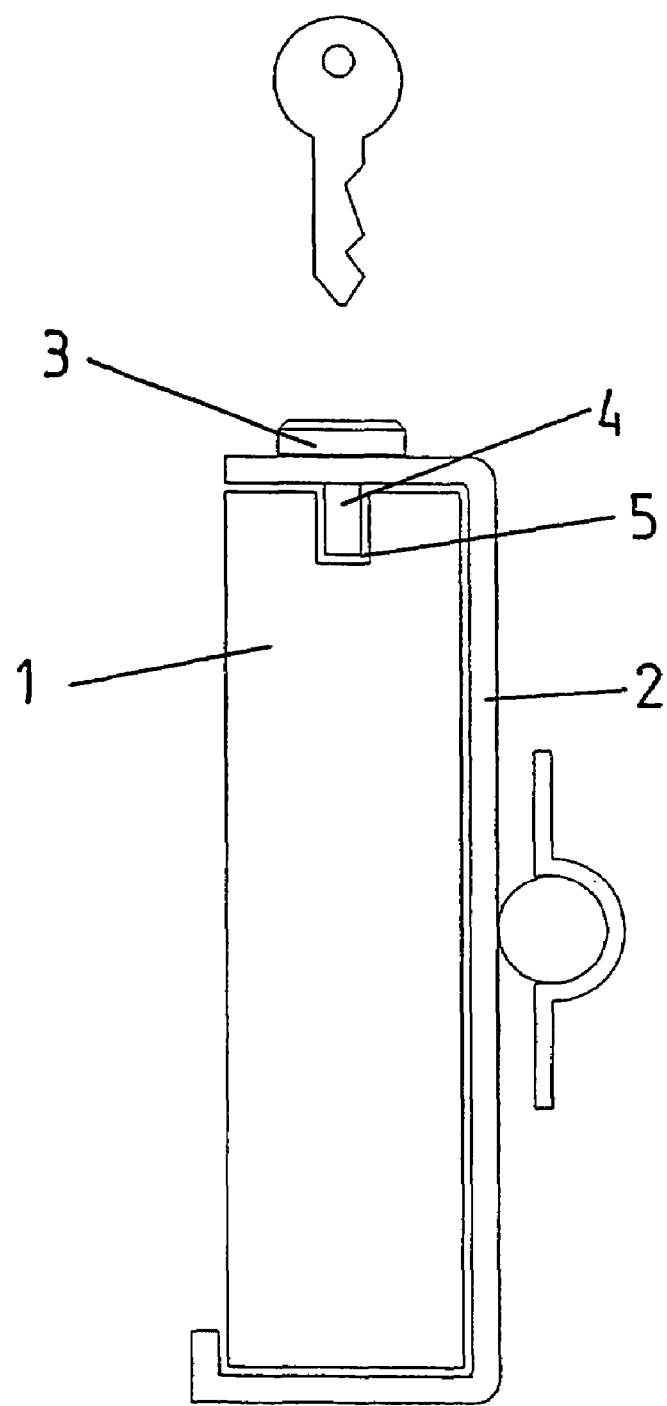
FIG. 1 a side view of a first embodiment.
Figure 2:
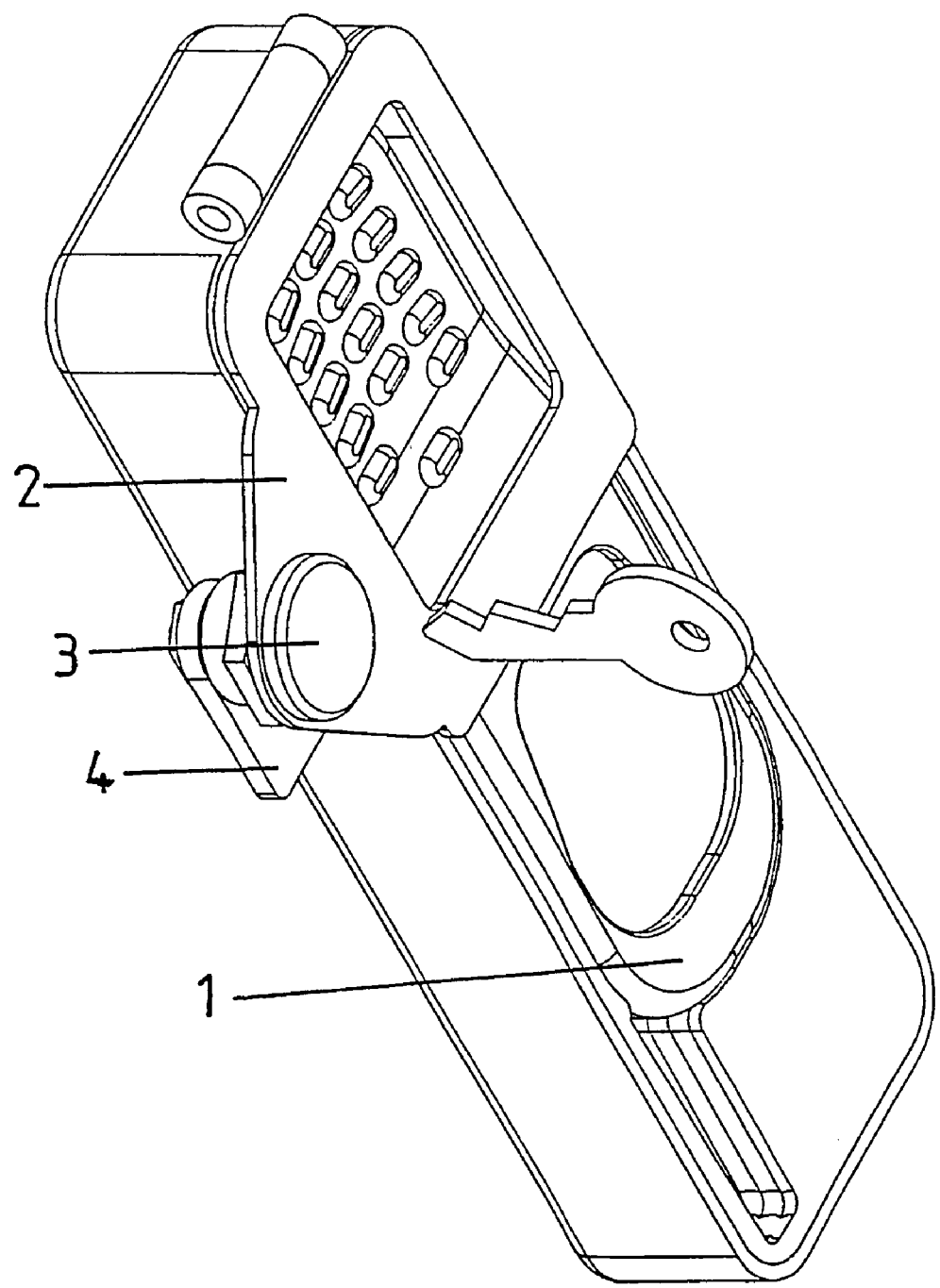
FIG. 2 a perspective view of another embodiment.
Figure 3:
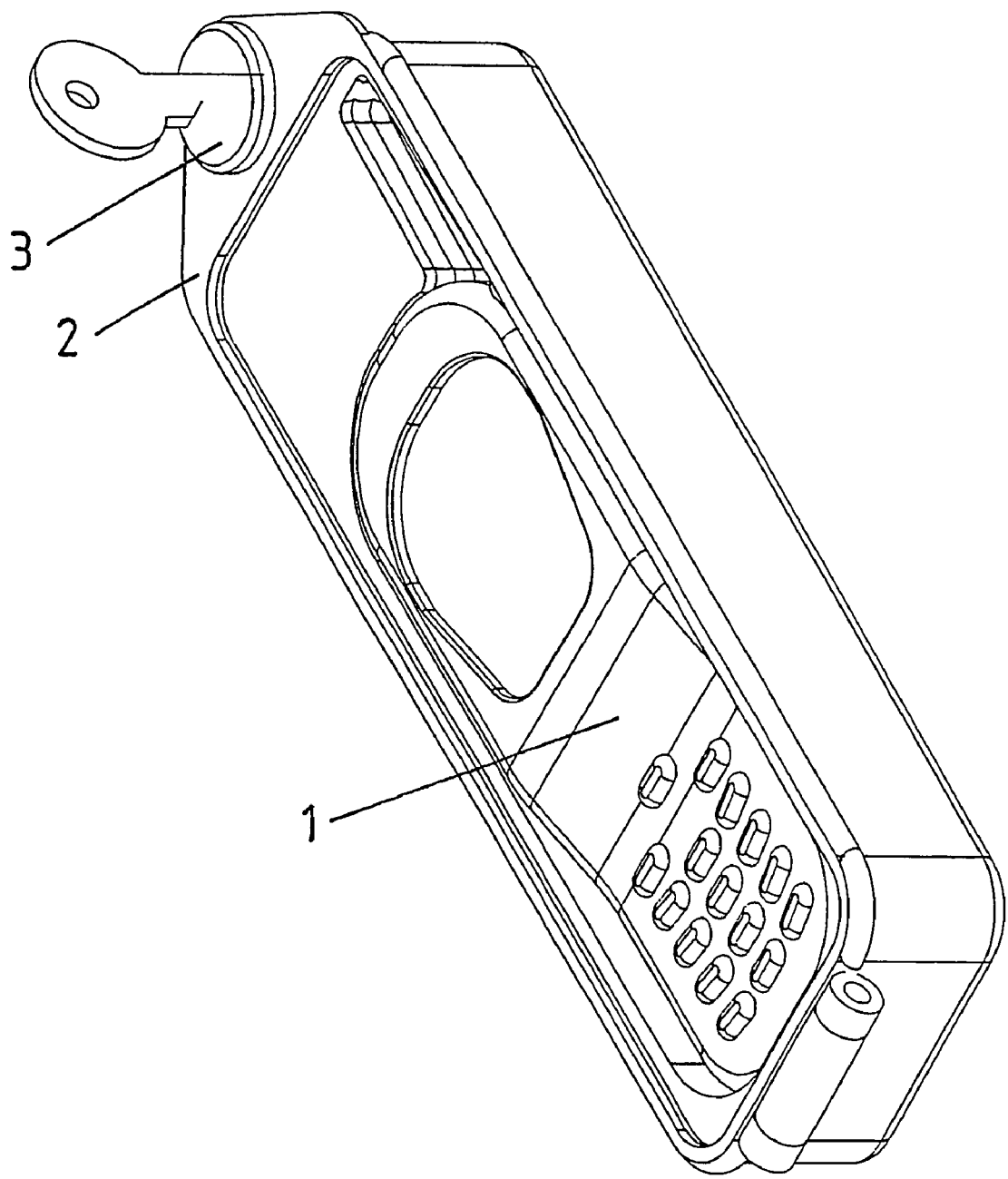
FIG. 3 a perspective view of yet another embodiment wherein the lock is arranged in an upper area.
Figure 4:
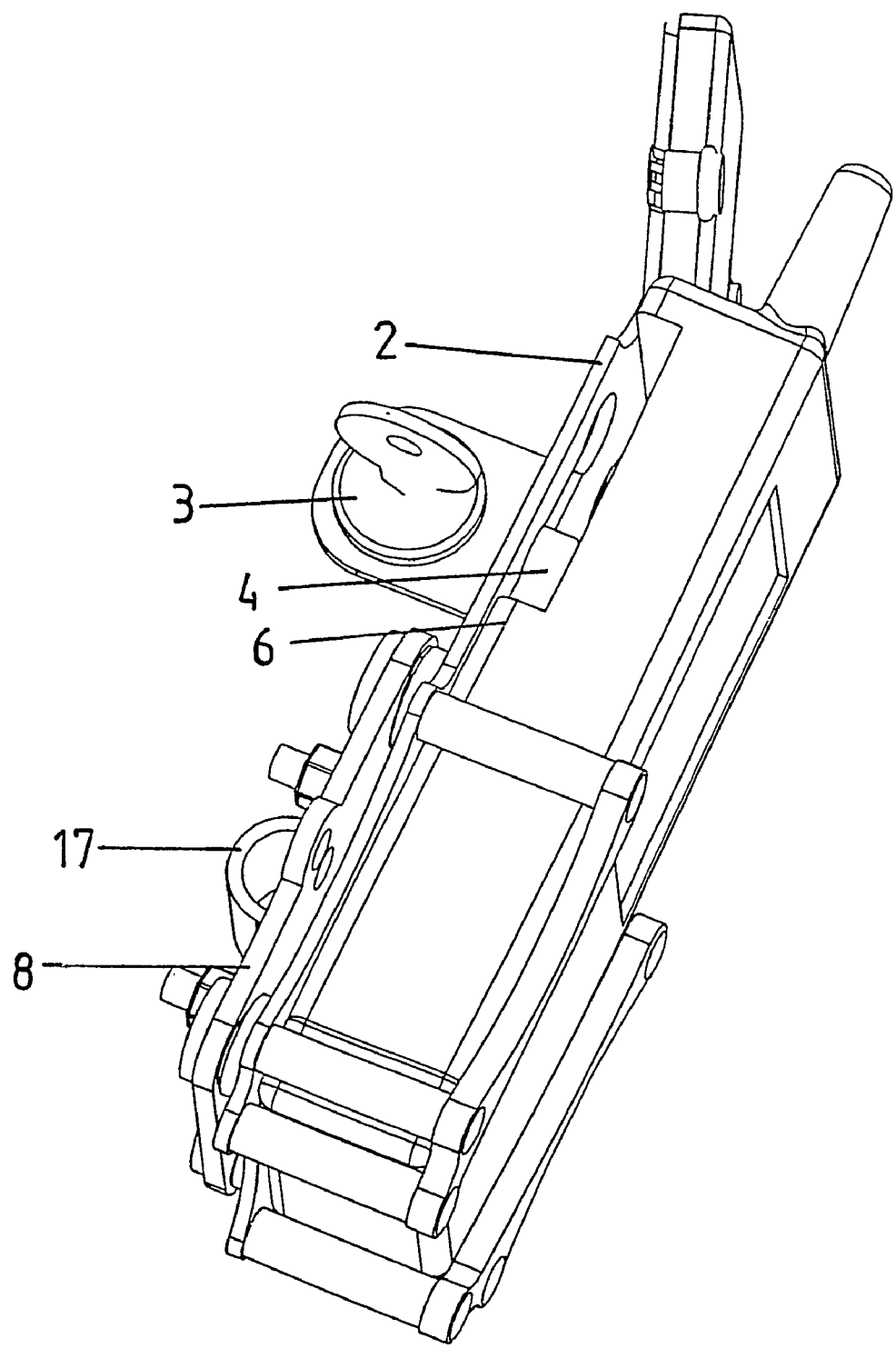
FIG. 4 a perspective view of another embodiment wherein the locking bar engages an edge of the accessory.
Figure 5:
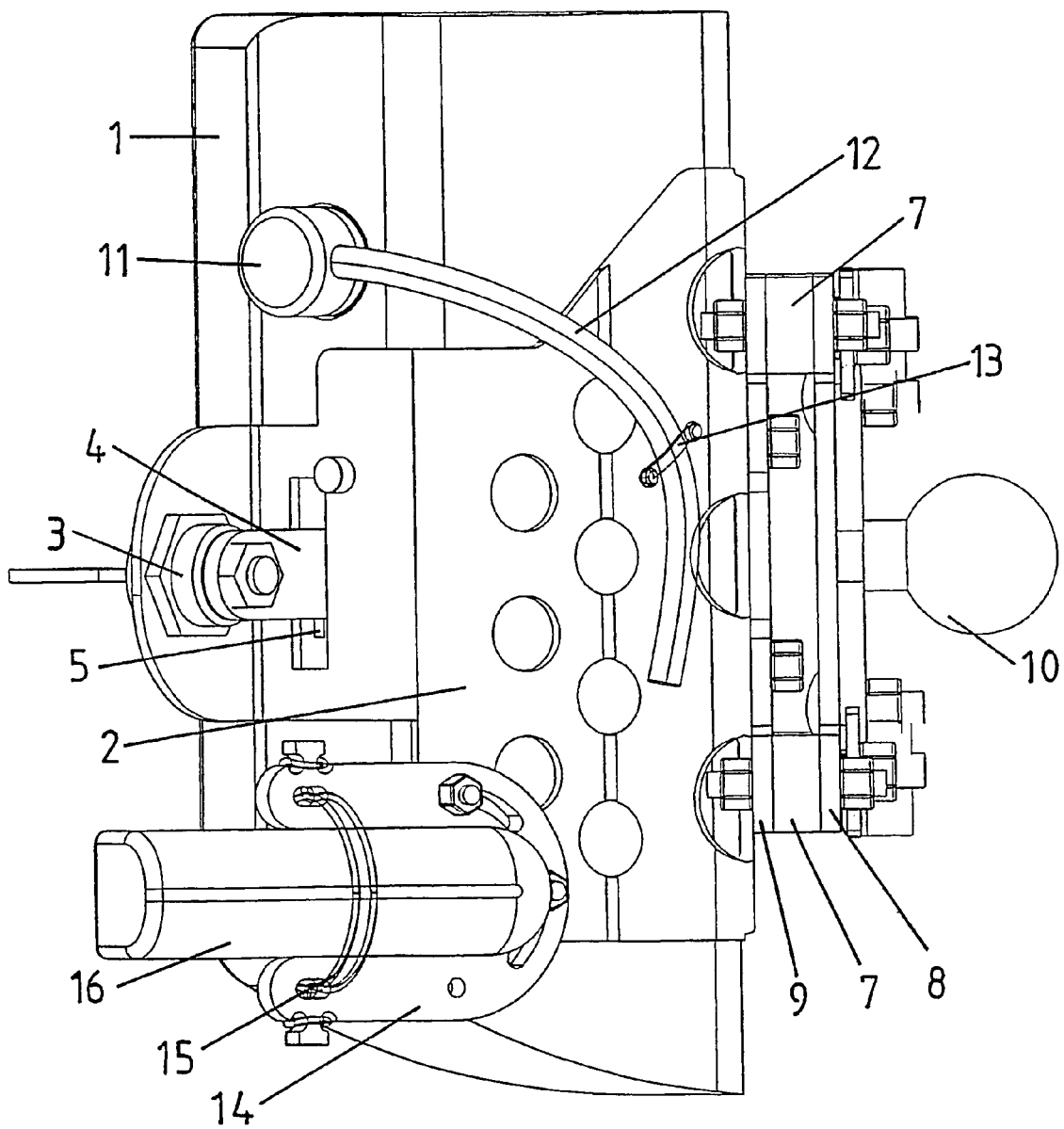
FIG. 5 a rear view of a further embodiment.

The accessory 1 is inserted into a mounting device having a mounting 2 that is shape-matched to the accessory 1 to be received. The mounting 2 has a lock 3 with a locking bar 4. The locking bar 4 engages a recess 5 of the inserted accessory 1. The lock 3 is connected to the mounting 2. The lock 3 can be located in a lateral area of the mounting 2, as illustrated in FIGS. 1 and 2, or in an upper area of the mounting 2 as illustrated in FIGS. 3 and 5. In all of these embodiments, the locking bar 4 engages a recess 5 that is arranged on the accessory 1 itself. In the embodiment according to FIG. 4, the locking bar 4 engages the edge 6 of the housing of the accessory 1 and locks thus this housing edge 6 so that the accessory 1 cannot be removed.

Since in particular electronic accessories 1, such as mobile phones, GPS devices or two-way radio devices, are inserted into the mounting 2, the mounting is protected against vibrations. As illustrated in FIG. 5, the mounting 2 has vibration elements 7 for vibration decoupling, and these elements are arranged between a lower bottom plate 8 and an upper bottom plate 9. The mounting 2 can be fastened by means of a lower bottom plate 8 with securing clamps 17 or with a spherical adapter 10 on the vehicle. In the mounting 2, a device plug 11 for a current/data cable 12 is integrated. The line 12 is secured in a cable retention means 13. Moreover, the mounting 2 has a rotatable antenna holder 14 within antenna retention means 15 so that the antenna 16 can be protected and stabilized in its position. The stabilization of the antenna 16, as illustrated in FIG. 5, is realized in that the antenna retention means 15 in the form of an O-ring clamps the antenna 16 on the antenna holder 14.

The invention is not limited to the illustrated embodiments. Several locks, for example, magnetic locks, can be provided and, advantageously, one or several locking devices can be activated by means of a central lock, preferably the ignition lock. Moreover, the mounting can comprise all functions of instrumentation and control lights.

What is claimed is:

1. A mounting device for electronic accessories for vehicles, the mounting device comprising:
   a mounting having a shape matched to a shape of an accessory to be received, wherein the accessory has a housing recess in the form of a groove or has a housing edge;
   a mechanical lock connected to the mounting;
   wherein the lock comprises a locking bar that is configured to engage the housing recess or the housing edge of the accessory to be received in the mounting;
   wherein the lock has a key for manual actuation of the lock by rotating the key in the lock wherein rotation of the key causes the locking bar to move in and out of engagement of the housing recess or the housing edge;
   vibration elements for vibration-decoupling the mounting from a vehicle on which the mounting is mounted.

2. The mounting device according to claim 1, comprising securing clamps for fastening the mounting on a vehicle.

3. The mounting device according to claim 1, comprising a device plug integrated into the mounting for connecting the accessory.

4. The mounting device according to claim 1, comprising a current supply fastened on the mounting.

5. A mounting device for electronic accessories for vehicles, the mounting device comprising:
- a mounting having a shape matched to a shape of an accessory to be received, wherein the accessory has a housing recess in the form of a groove or has a housing edge;
- a mechanical lock connected to the mounting;
- wherein the lock comprises a locking bar that is configured to engage the housing recess or the housing edge of the accessory to be received in the mounting;
- wherein he lock has a key for manual actuation of the lock by rotating the key in the lock wherein rotation of the key causes the locking bar to move in and out of engagement of the housing recess or the housing edge;
- a spherical adapter for fastening the mounting on a vehicle.

6. A mounting device for electronic accessories for vehicles, the mounting device comprising:
- a mounting having a shape matched to a shape of an accessory to be received, wherein the accessory has a housing recess in the form of a groove or has a housing edge;
- a mechanical lock connected to the mounting;
- wherein the lock comprises a locking bar that is configured to engage the housing recess or the housing edge of the accessory to be received in the mounting;
- wherein the lock has a key for manual actuation of the lock by rotating the key in the lock wherein rotation of the key causes the locking bar to move in and out of engagement of the housing recess or the housing edge;
- at least one of an antenna connector and a data connector connected to the mounting.

7. The mounting device according to claim 6, comprising vibration elements for vibration-decoupling the mounting from a vehicle on which the mounting is mounted.

8. The mounting device according to claim 6, comprising an antenna holder connected to the mounting.

9. The mounting device according to claim 8, wherein the antenna holder has an antenna retention means for securing an antenna.

* * * * *